March 14, 1950 C. J. KRCO 2,500,290
PAN HEAD FOR A TRIPOD
Filed July 1, 1947 3 Sheets-Sheet 3
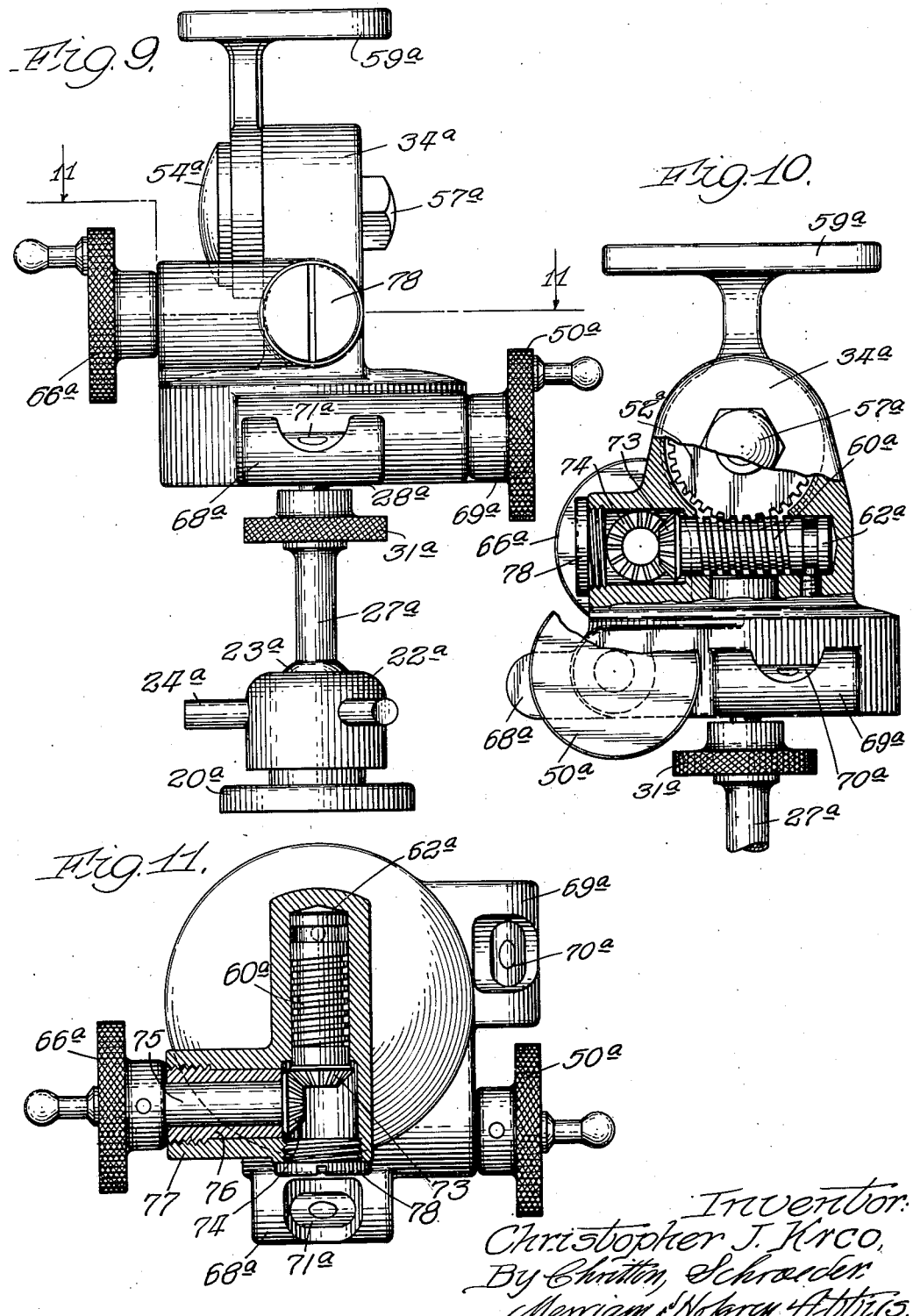

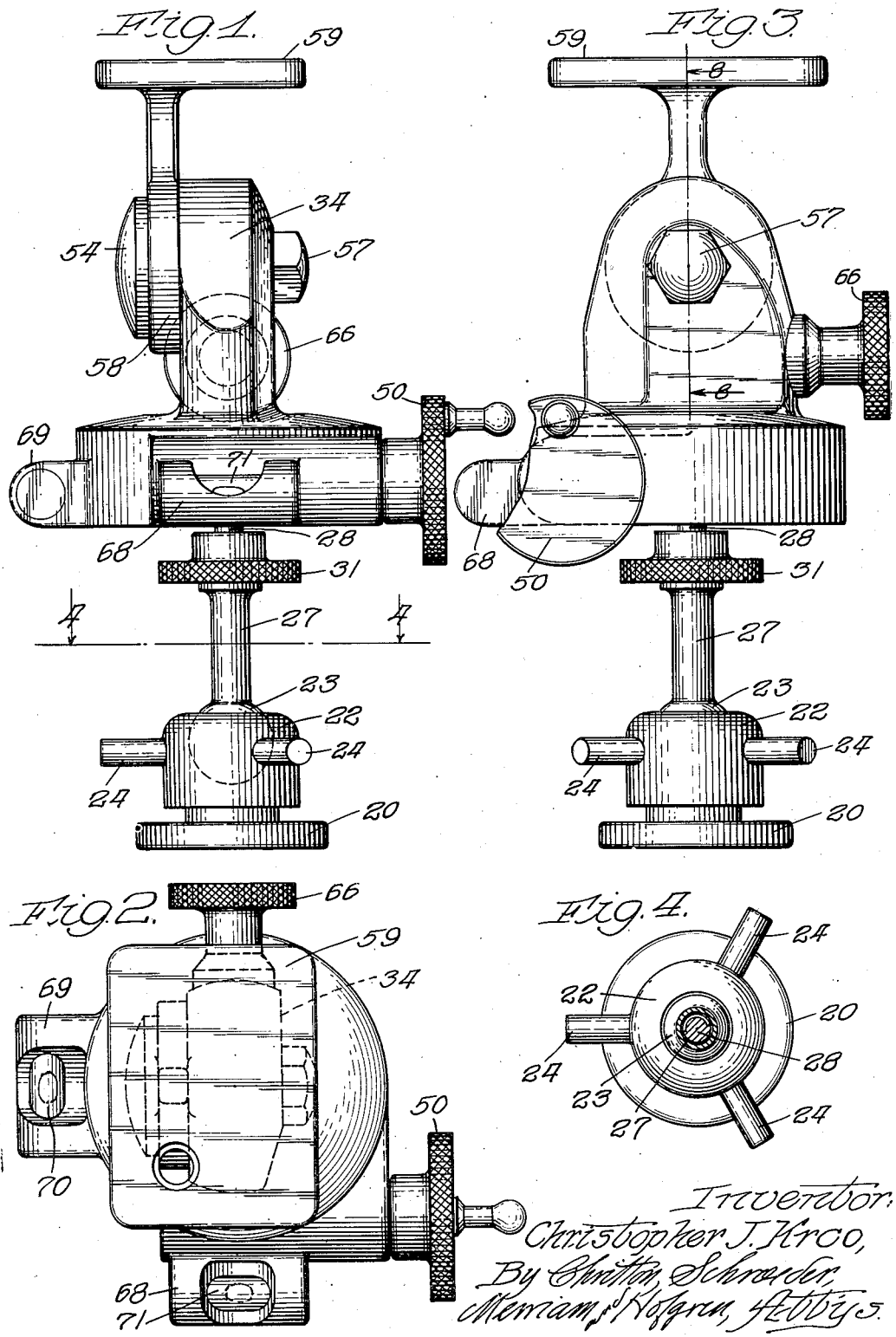

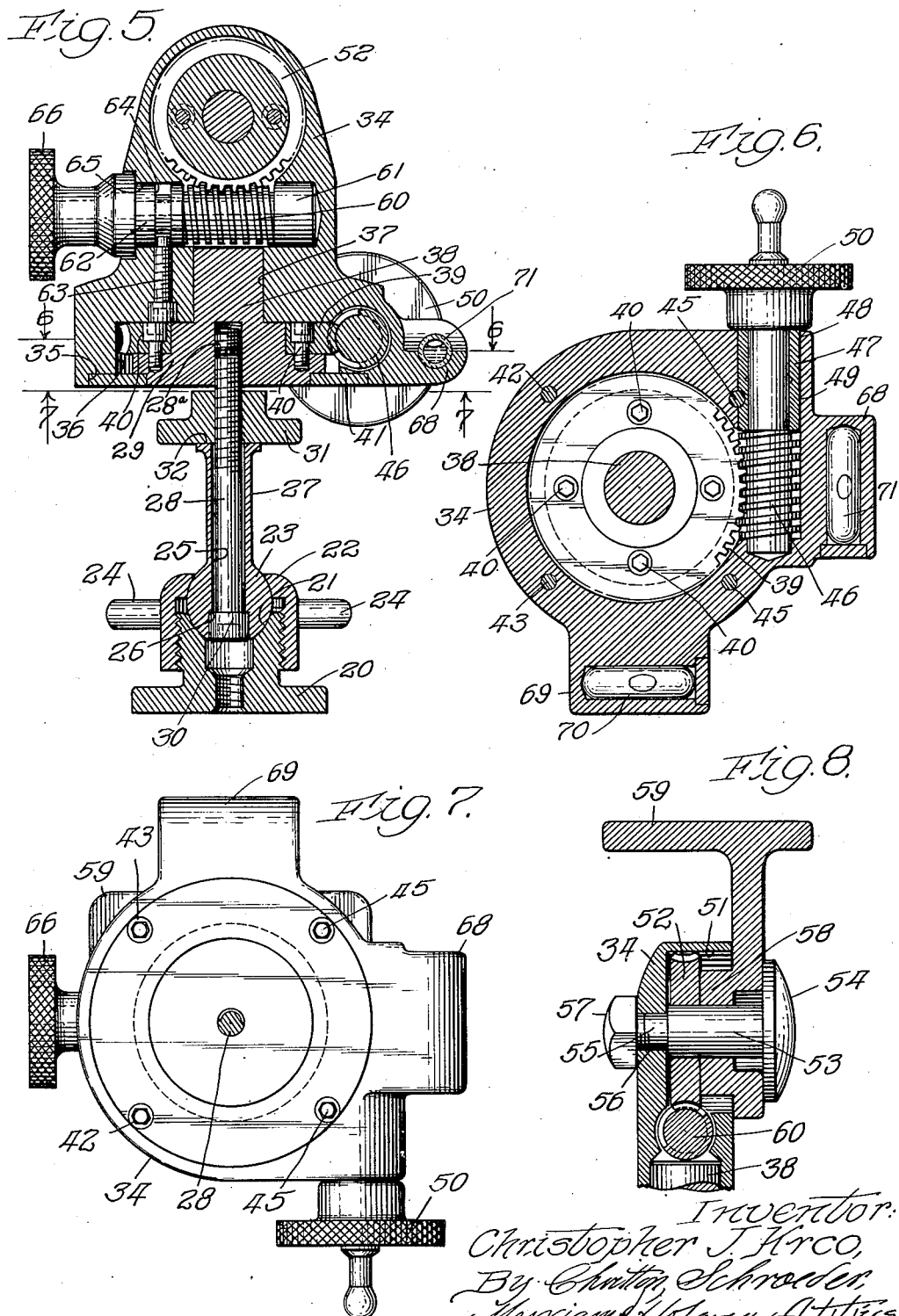

Patented Mar. 14, 1950

2,500,290

UNITED STATES PATENT OFFICE 2,500,290

PANHEAD FOR A TRIPOD

Christopher J. Krco, Chicago, Ill.

Application July 1, 1947, Serial No. 758,317

5 Claims. (Cl. 248—183)

1

This invention relates to a pan head adapted to be attached to a tripod for imparting slow, steady panoramic movement to a photograph camera.

While the pan head of my invention may be used with various instruments, it is particularly adapted for use with a motion picture camera and will hereinafter be described as used in conjunction therewith.

When photographing motion pictures, it is often found desirable to impart a panoramic movement to the camera, that is, a pan in either a horizontal or vertical plane or a combination thereof. The tripod to which the pan head is attached is often set upon rough or uneven ground and means should be provided in such a device for leveling the head. Means should further be provided for imparting a slow, steady, panoramic movement to the camera in either plane. It is also extremely advantageous to incorporate a clutch means in such a device so that the camera may be swung rapidly in a horizontal plane from one scene to another, and then clutched to the gears in order that slow pan may be resumed. Commercial movie studios employ large and expensive camera supports possessing many of the qualities just discussed, but generally such mounts are too cumbersome and far too expensive for the average amateur movie maker.

I have invented and am herein disclosing and claiming a pan head which incorporates all of the above features, and is so designed and arranged that it may be constructed inexpensively, and may be light weight and durable.

The invention will be described as embodied in the accompanying drawings in which:

Fig. 1 is a side elevation of the pan head;

Fig. 2 is a top plan view of the device of Fig. 1;

Fig. 3 is a view like Fig. 1 taken 90° therefrom;

Fig. 4 is a horizontal section along lines 4—4 of Fig. 1;

Fig. 5 is a vertical section through the device showing the various gears and other details of construction;

Figs. 6 and 7 are horizontal sections taken along lines 6—6 and 7—7, respectively, of Fig. 5;

Fig. 8 is a vertical section taken along lines 8—8 of Fig. 3;

Fig. 9 is a view like Fig. 1 showing a modified form of the device;

Fig. 10 is a view taken 90° from Fig. 9 and partly broken away for clarity of illustration; and, Fig. 11 is a horizontal section taken along line 11—11 of Fig. 9.

2

Referring now to the drawings, 20 indicates a base member adapted to be attached to the top of a tripod (not shown) and constituting the lower half of a socket arrangement 21. A collar-like member 22 comprises the upper half of the socket and is adapted to be threaded to the lower half 20, as shown, to clamp a ball 23 in any desired position in the socket. The member 22 is provided with lugs 24 to assist in the manual tightening of the device. The ball is provided with a hole 25 having an enlarged portion 26 at one end and is provided with a tubular extension 27.

Rotatably mounted within the hole and extension is a supporting member 28 which projects beyond the extension and is screwed into a gear carrying member 29. A jam screw 28a is adapted securely to hold the member 28 within the member 29. The supporting member 28 has one end enlarged at 30, as shown, adapted to wedge against the edges of the enlarged portion 26 of the hole in the ball. A collar 31 is threaded to the supporting member 28. Upon being rotated the collar is adapted to contact the upper end 32 of the extension 27 to cause the enlarged end 30 of the supporting member to be wedged against the enlargement 26 in the ball to prevent further rotation of the supporting member.

A housing 34 is provided with a first countersunk portion 35, a second coaxial and smaller countersunk portion 36 and a third coaxial and still smaller countersunk portion 37. The gear carrying member 29 is provided with a central integral journal 38 rotatable within the countersunk portion 37. The gear carrying member carries a first worm gear 39 secured thereto by a plurality of bolts 40. The member 29 and worm gear 39 may be in one piece, if found preferable. The member 29 is retained within the countersunk portions 36 and 37 by an annular plate 41 secured within the countersunk portion 35 by means of bolts 42, 43, 44 and 45. Meshing with the gear 39 is a worm 46 rotatably mounted in a bushing 47 secured in a hole 48 in the housing. The bushing is provided with an annular groove 49 which is engaged by the bolt 45 to prevent the bushing and hence the worm from slipping out of the housing. If desired, the bushing may be tapped to receive the bolt 45 in the manner of a set screw. Crank means 50 are provided for rotating the worm.

The upper portion of the housing 34 is provided with a second countersunk portion 51 in which a second worm gear 52 is rotatably mounted about a shaft 53. The shaft has a head 54 and a reduced portion 55 extending through a hole 56 coaxial with the countersunk portion 51, the portion 55 being bolted to the housing by a nut 57. Secured to the gear 52 by means of a boss 58 is a camera carrying platform 59. Meshing with the gear is a second worm 60 rotatably mounted in bushings 61 and 62. A screw 63 is adapted to engage an annular groove 64 in the bushing to hold the bushing within an opening 65 in the housing. Crank means 66 are provided for rotating the second worm. The platform 59 will, of course, be provided with the usual means for securing a camera thereto and the base member 20 will be attachable to the top of a common tripod.

Mounted in integral ears 68 and 69 are two bubble levels 70 and 71 positioned as shown.

The embodiment shown in Figs. 9 to 11, inclusive, is similar to the previous embodiments. Therefore, like parts will be given like reference numerals with the letter "a" added. The worm 60a is again rotatably mounted in a bushing 62a and is provided at its opposite end with a beveled gear 73 meshing with a second beveled gear 74 secured upon a shaft 75 having a crank means 66a mounted on the outer end thereof. While beveled gears are shown, a worm and worm gear may be substituted therefor if a slower, smoother vertical pan is required. The shaft 75 is rotatably mounted within a bushing 76 threaded into a projection 77 of the housing. The housing is further provided with a screw cap 78 threaded into the housing, as shown, to provide means of access to the worm 60a and its beveled gear 73.

In this embodiment, it is noted that the crank means 66a and 50a rotate about axes which are parallel to each other and the cranks themselves are situated on opposite sides of the housing for easy accessability. To provide sufficient room for the rotation of the crank 66a, the level 70 has been moved to the opposite side of the housing to the position of the level 70a, shown in Fig. 11.

In operation, the device may be used as follows. With the pan head located on the tripod and a camera secured thereto, the ball and socket arrangement is loosened by means of the lugs 24 and the housing adjusted until the levels indicate it to be upon a horizontal plane. The ball and socket arrangement may then be clamped by means of the lugs 24 to hold the housing and camera in that position. The collar 31 may then be rotated so as to unclutch the supporting member and permit its rotation within the tubular projection and ball so that the housing may be rotated about a horizontal plane until the desired subject is in view. Rotation of the collar in the opposite direction will then clutch the supporting member to the ball to affix firmly the housing in its desired position. Slow motion of the camera may then be obtained in either the horizontal or vertical plane by rotation of either or both of the crank means. It will be noted from the foregoing that the housing 34 is a single casting, and is provided with two countersunk portions to receive the gears, and two openings to receive the bushings and worms. I prefer to construct the housing of aluminum to decrease the weight of the device. By reason of the particular design shown herein, the difficulty and cost of manufacture have been greatly reduced. The bushings in which the worms are rotatable may easily be slipped in and out of the openings for facility of assembly and repair, and are held securely within the openings by the set screws described.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a pan head having a housing, a camera platform mounted on the housing, gears in the housing for imparting motion to the platform in two planes substantially perpendicular to each other, means for leveling the platform and for rotating the same in one of said planes independently of the gear means comprising: a ball having an opening therethrough, a socket for the ball, a manually operable clamp for clamping the ball within the socket, a tubular extension on the ball aligned with the opening therein, a housing support attached to one of said gears and projecting through the extension, said housing support having an enlarged end located in the opening in the ball, and a collar threaded to the housing support and contacting the end of the extension to draw the enlarged end of the housing support against the edges of the opening in the ball under clamping tension.

2. A pan head comprising a unitary housing, a countersunk portion in the housing, a worm gear rotatably mounted in the countersunk portion in one plane, a worm engaging the gear and rotatably mounted in an opening in the housing, a second countersunk portion in the housing, a second worm gear rotatably mounted in the second countersunk portion in a plane substantially perpendicular to the first plane, a second worm engaging the second gear and rotatably mounted in a second opening in the housing, a camera supporting platform connected to the second gear, a ball having an opening therethrough, a socket for the ball, a manually operable clamp for clamping the ball within the socket, a tubular extension on the ball aligned with the opening therein, a housing support attached to said first mentioned gear and projecting through the extension, said housing support having an enlarged end located in the opening in the ball, and a collar threaded to the housing support and contacting the end of the extension to draw the enlarged end of the housing support against the edges of the opening in the ball under clamping tension.

3. A pan head comprising a unitary housing, a counter-sunk portion in the housing, a gear mounted in the counter-sunk portion on a spindle for rotation in one plane, a worm engaging the gear and rotatably mounted in a bushing, said bushing being removably mounted in an opening in a housing, a housing support attached to said gear, a second counter-sunk portion in the housing, a second gear mounted in the second counter-sunk portion for rotation in a plane substantially perpendicular to the first plane, a second worm engaging the second gear and rotatably mounted in a second opening in the housing, a camera supporting platform connected to the second gear and means for manually rotating each of said worms to rotate said platform in each of said planes.

4. The pan head of claim 3 in which said first gear is held in said counter-sunk portion by an annular plate bolted to the housing.

5. The pan head of claim 4 in which said bushing for the first worm is removably secured to the housing by one of said bolts.

CHRISTOPHER J. KRCO.

REFERENCES CITED

The following references are of record in the file of this patent:

UNITED STATES PATENTS

| Number | Name | Date |
|---|---|---|
| D. 148,778 | Fishter | Feb. 24, 1948 |
| 1,211,895 | Theiss | Jan. 9, 1917 |
| 1,764,721 | Hayden | June 17, 1930 |
| 1,798,446 | Zerk | Mar. 31, 1931 |
| 1,831,086 | Zerk | Nov. 10, 1931 |
| 1,849,556 | Arnold | Jan. 12, 1932 |
| 2,293,593 | Clark | Aug. 18, 1942 |
| 2,333,306 | Fishter | Nov. 2, 1943 |

FOREIGN PATENTS

| Number | Country | Date |
|---|---|---|
| 527,724 | France | Oct. 29, 1921 |